United States Patent [19]

Menozzi

[11] Patent Number: 4,770,576

[45] Date of Patent: Sep. 13, 1988

[54] ATTACHMENT DEVICE FOR MACHINE TOOL

[75] Inventor: Romain Menozzi, Courroux, Switzerland

[73] Assignee: Schaublin SA succursale de Delemont, Delemont, Switzerland

[21] Appl. No.: 871,915

[22] Filed: Jun. 9, 1986

[30] Foreign Application Priority Data

Jun. 25, 1985 [CH] Switzerland ............... 2702/85

[51] Int. Cl.⁴ ............................................. B23C 5/26
[52] U.S. Cl. .................................. 409/232; 279/1 TS; 408/239 R
[58] Field of Search .............. 408/239 R, 239 A, 226; 409/230, 231, 232, 233, 234; 279/1 G, 1 TS

[56] References Cited

U.S. PATENT DOCUMENTS 3,115,348  12/1963  Penland ..................... 279/1 TS X

FOREIGN PATENT DOCUMENTS

| 871990 | 3/1953 | Fed. Rep. of Germany ...... 408/226 |
| 1104855 | 4/1961 | Fed. Rep. of Germany ........ 279/16 |
| 2146876 | 8/1972 | Fed. Rep. of Germany ...... 409/233 |
| 2545928 | 5/1977 | Fed. Rep. of Germany . |
| 1180254 | 6/1959 | France . |
| 1492649 | 8/1967 | France . |

OTHER PUBLICATIONS

VSM 33930-1973.

Primary Examiner—Z. R. Bilinsky
Attorney, Agent, or Firm—Parkhurst & Oliff

[57] ABSTRACT

A tool-holder has a frustoconical outer centering surface which fits over a matching surface of a spindle. At the rearward end of the former surface are two axial slots and two circumferential grooves. Each of the slots receives a key borne by two spring-rings fitted in the grooves. The keys therefore rotate together with the tool-holder but are radially movable so that they can yield when the tool-holder is put in place if they come up against ribs forming part of the coupling components of the spindle.

10 Claims, 4 Drawing Sheets

ATTACHMENT DEVICE FOR MACHINE TOOL

This invention relates to accessories for machine tools, and more particularly to a device for attaching an interchangeable tool-holder to a spindle of a metal-cutting machine, of the type in which the two parts—spindle and tool-holder—have centering surfaces of revolution capable of co-operating with one another, and coupling means which, for a first one of those parts, consist of a succession of longitudinal grooves and ribs.

Numerous metal-cutting machines are now equipped with numerical controls and comprise automatic tool-changing devices facing the tool-holding spindle or spindles, so that the machining programs may include several successive machining operations carried out with different tools by means of one and the same rotating spindle, without its being necessary to modify the position of the part or bar being machined.

In general, the automatic tool-changing devices comprise a conveyor arm provided with a claw, maneuverable so as to seize the tool-holder mounted on the spindle, disengage it from the spindle to place it in a magazine, insert a new tool-holder in the spindle, and couple the former to the latter in a position ensuring driving of the tool-holder and transmission of the necessary torque.

However, presenting the new tool-holder in a position such that coupling to the spindle takes place correctly poses a problem. In general, the tool-holder is fixed in the spindle by means of a draw-in rod which acts axially and includes at the end either a thread engaging a matching tapped portion of the tool-holder or an automatic gripping system which grabs a rear prolongation of the tool-holder. In order to establish a connection capable of transmitting a torque between the spindle and the tool-holder, provision is often made for driving keys on one of the parts and corresponding openings or notches on the other, or for a male section engaging a corresponding female section. In order to ensure that these elements engage one another in prior art devices, the spindle must be stopped in a fixed orientation, on the one hand, and the conveyor arm must present the tool-holder in a position such that the coupling elements engage by means of a simple axial movement, smoothly and without jamming. Thus the spindle must be equipped with a positioning spindle-stopping device, and the spindle-stopping operations are prolonged so that the machine is not used under optimum conditions. Furthermore, its cost is increased by the expense incurred for the positioning spindle-stopping device.

German Disclosed Application (DOS) No. 25 45928 describes a device of this type in which the two parts, spindle and tool-holder, each comprise a toothed rim, the cross-sections of the two rims being complementary. The same applies to French Pat. No. 1,492,649. In the device described in this last patent, however, there is provided a key-shaped part movable radially against the bias of a spring and capable of correcting the relative positioning of the two members at the time of their engagement. Nevertheless, the presence of this auxiliary part creates a dissymmetry in the arrangement of the coupling device, which dissymmetry is the source of imbalance caused by centrifugal force during high-speed rotation.

A device of the same type is likewise described in French Pat. No. 1,180,254, but it is not intended for coupling a tool-holder to a driving spindle in a metal-cutting machine rotating at high speed. Neither is the arrangement of the coupling means symmetrical relative to the common axis of the two parts, so that the effects of the non-balanced centrifugal force may make themselves felt.

It is an object of this invention to provide an improved attachment device by means of which a tool-holder may be put in place without any predetermined positioning of the spindle being necessary.

A further object of this invention is to provide an attachment device which easily adapts to the usual connection means between spindles and tool-holders, e.g., to standardized tooling cones such as those conforming to standard 33930 of the association of Swiss machine manufacturers (VSM) or to other standards and special designs of the same type.

Still another object of this invention is to provide a simple attachment device which operates reliably even at maximum speeds.

To this end, in the attachment device according to the present invention, of the type intially mentioned, the coupling means on the second part consist of an assembly of keys rotatingly integral with that second part, radially movable relative thereto, the width of which is adapted to the cross-section of the grooves, disposed symmetrically relative to the axis of the second part, and spring means acting upon the keys in the radial direction so as to fit each of them into a groove of the first part in coupling position.

The term "tool-holder" is understood here to mean a part capable of receiving either a tool, such as a milling-cutter or drill having a cylindrical shank, or a clamp intended in turn to receive the tool itself.

As will be seen below, in a preferred embodiment of the invented device, the tool-holder has at the rear of its centering surface—which may itself be cylindrical or conical—coupling elements composed of two keys supported by two split rings, each key being welded on one of the rings and further including a slit which guides the other ring.

This preferred embodiment of the invention will now be described in detail with reference to the accompanying drawings, in which.

Figure 3:
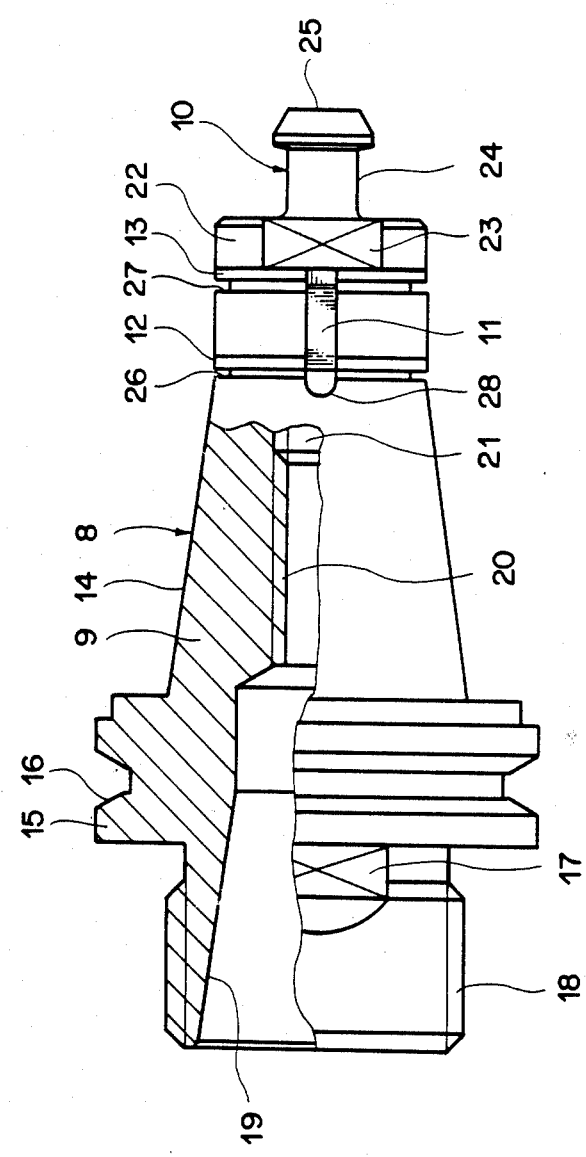
Figure 5:
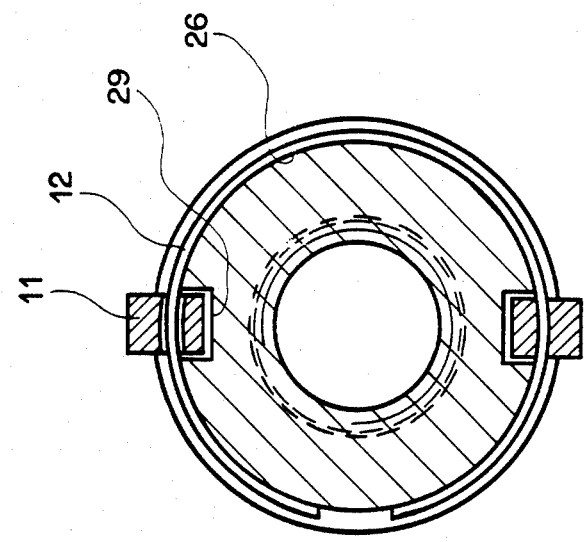
Figure 4:
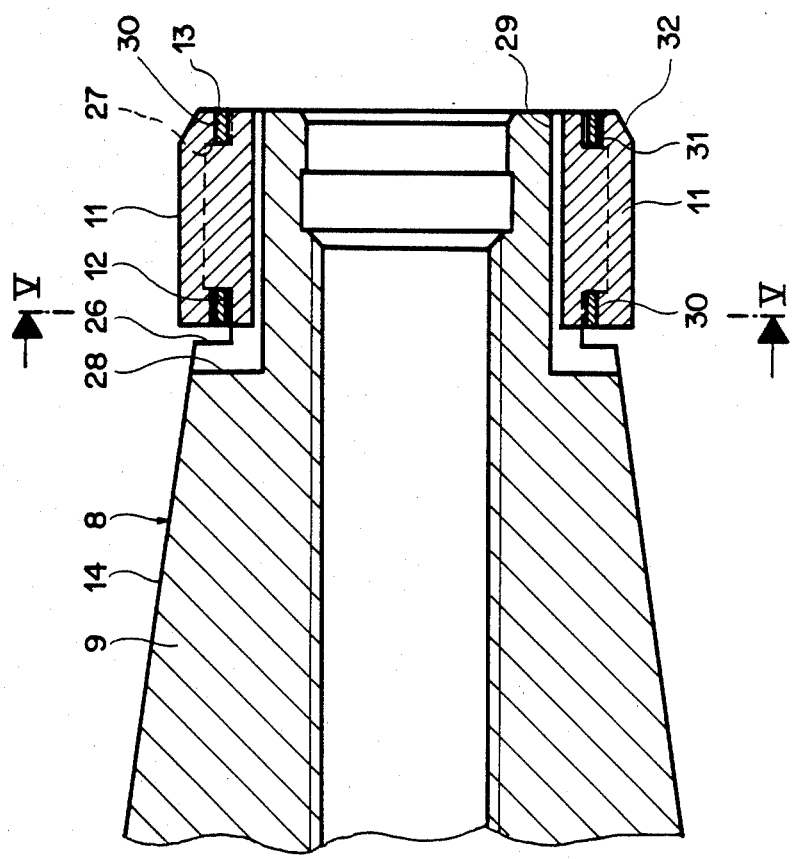
Figure 7:
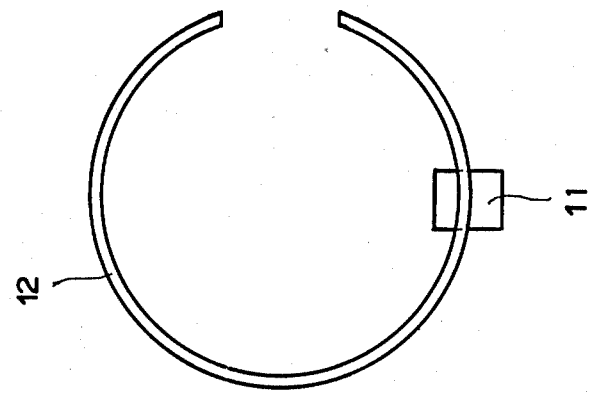
Figure 6:
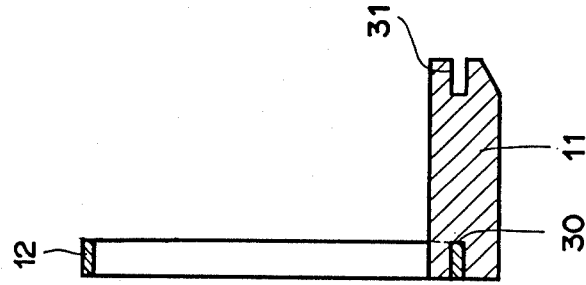

FIG. 3 is a view, partially in section and partially in elevation, of the tool-holder on a slightly larger scale, FIG. 4 is a partial sectional view of the tool-holder shown in FIG. 3 on a larger scale, the grabbing part being removed, FIG. 5 is a section taken on the line V—V of FIG. 4, and FIGS. 6 and 7 are an axial section and a front elevation, respectively, on the same scale as FIG. 4, of a key and the associated ring.

Figure 2:
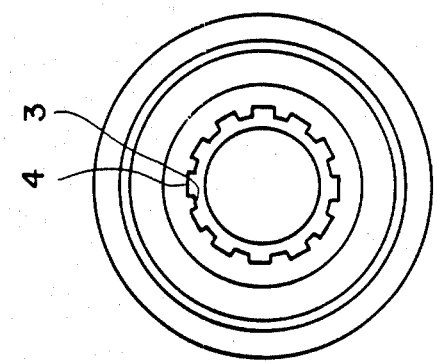
FIG. 2 is an elevation of the end of the spindle shown in FIG. 1.
Figure 1:
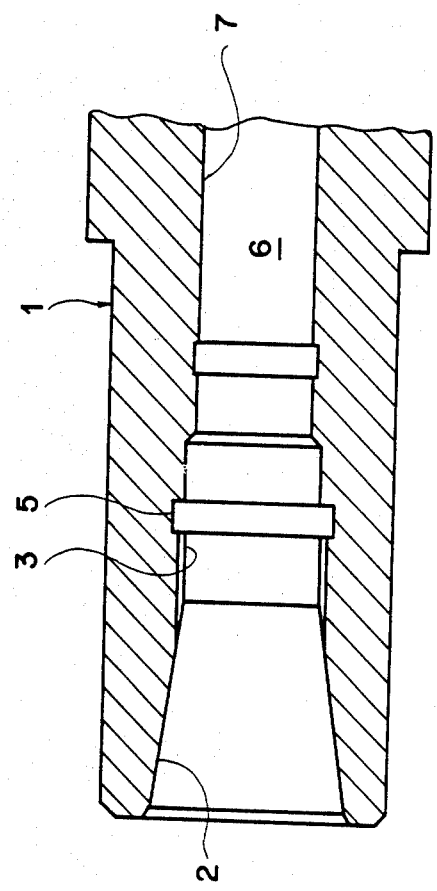
FIG. 1 is an axial section through the end of a machine tool spindle.

The spindle 1 shown in FIG. 1 forms part of a numerically controlled turning center having an automatic tool-changing device. It might equally well form part of a machine tool with manual tool-changing, however. It is not necessary to show here how this spindle is supported on a frame capable of executing translatory movements in response to the numerical control of the machine, nor how it is rotated about its axis in bearings connecting it to the frame. Spindle 1 has an axial socket 6 which ends at the front in a conical centering surface 2. At the inner end of surface 2, spindle 1 comprises coupling elements constituted by ribs 3 of rectangular cross-section separated from one another by corresponding grooves 4. The inside diameter of ribs 3 corresponds to the terminal diameter of centering surface 2. Axially, ribs 3 extend up to a shaped portion 5 of axial passage 6. Over the greater part of its length, passage 6 comprises a bore 7. It is intended to guide a traction part (not shown) capable of coming in to seize a tool-holding part 8, as will be seen below.

Tool-holding part 8 is shown in its entirety in FIG. 3. It is made up of a coupling 9, a grabbing part 10, two keys 11, and two spring-rings 12 and 13. Most of the operational elements of coupling 9 will often have a standardized form but may be of a special design instead. Its conical outer centering surface 14 matches centering surface 2 of spindle 1. In front of surface 14 there is a collar 15 having a circular groove 16 of trapezoidal cross-section. The tool-holding part illustrated in FIG. 3 comprises, in front of collar 15, a cylindrical bearing surface in which two flats 17 have been made, and in front of this bearing surface, a threaded portion 18 intended to receive a clamp tightening nut. The interior of tool-holding part 8 includes a centering cone 19 followed by a threaded axial passage 20. However, any other coupling and connecting element between the tool-holder and the tool or clamp might equally well be provided for in lieu of elements 19 and 18. In the embodiment being described, tapped portion 20 is intended to receive the threaded front portion 21 of part 10. As may be seen in FIG. 3, there is a collar 22 provided with two flats 23 situated about halfway along grabbing part 10, by means of which it can be screwed into tapped portion 20. Toward the rear, the grabbing part continues into a shaft element 24 and ends with a knob 25 which can be grabbed by a claw or other traction means (not shown), this means being connected to the draw-in rod provided inside the axial passage 6 of spindle 1. Thus part 8 may be held in place axially within spindle 1, its centering surface 14 lying flat against surface 2 of spindle 1.

In order to couple tool-holder 8 to spindle 1 without its being necessary to orient the two parts relative to one another beforehand, tool-holder 8 is equipped at the rear part of coupling 9 with a system of two keys 11 held in place by spring-rings 12 and 13. Coupling 9 is machined with a circumferential groove 26 and a further groove 27, both of rectangular cross-section, and with two axially milled rectangular slots 28 and 29 situated diametrically opposite one another. One of the two keys 11 is shown in detail in FIGS. 6 and 7. It is a parallelepiped block provided at each end with a slit 30, 31 having a rectangular cross-section matching that of the two rings 12 and 13. Ring 12 is soldered, for instance, in the slit 30 of one of the keys 11, while ring 13 is soldered in the same way in the slit 31 of the other key 11. In that way, each key 11 is borne by one of the two split rings and guides the other split ring at a location diametrically opposed to that at which the latter ring is fixed to the other key. The keys are thus held in place in the longitudinal slots 28 and 29 so as to rotate with coupling 9. However, inasmuch as they are supported by rings 12 and 13, they are movable radially in slots 28 and 29. Each key 11 has at its rearward end a bevel 32 which ensures that spring-rings 12 and 13 are compressed upon the engagement of tool-holder 8 if keys 11 come up against ribs 3 of spindle 1. Thus it becomes possible to engage tool-holder 8 without having to take the orientation of spindle 1 into account. If keys 11 are situated exactly facing two grooves 4, diametrically opposite, they fit into these grooves, and tool-holder 8 is directly coupled to spindle 1. If, on the other hand, keys 11 come up against ribs 3, rings 12 and 13 are compressed, and keys 11 move radially toward the axis of tool-holder 8, the depth of slots 28 and 29 being provided for accordingly. However, at the moment when the tool comes in contact with the workpiece to be machined, the torque reaction causes tool-holder 8 to rotate relative to spindle 1, and keys 11 snap into two diametrically opposed grooves 4, thus producing the automatic coupling.

In this way, there is achieved a very simple, compact device which, as stated previously, presents the advantage that it is no longer necessary to equip the turning center with positioning spindle-stopping devices. The result is a saving in time whenever a tool is changed. Moreover, the fitting of a tool is facilitated even when the change is performed manually since it is no longer necessary to look for the entries of the coupling grooves when putting the tool in place.

It should also be noted that the arrangement described might equally well be reversed, in the sense that the tool-holder would have a series of ribs and grooves, whereas the inside socket of the spindle would be provided with keys mounted on springs. Whichever arrangement is chosen, ways of mounting the keys other than those described may likewise be imagined. For instance, each key might be supported by a blade spring diposed axially or, if need be, biased by spring elements of some other form than arched or curved blades. Finally, the device described would also find application in the case where the spindle would, in fact, be a shaft having coupling means at its periphery rather than in an inside socket, the tool-holder, for its part, being made in the form of an outer coupling fitting over the end of the shaft.

What is claimed is:

1. A device for interconnecting a first rotary part and a second rotary part of a metal-cutting machine, said first rotary part having an inner centering surface adapted to cooperate with an outer centering surface of said second rotary part when said second rotary part is axially inserted in said first rotary part, said device comprising:
    first coupling means comprising a plurality of longitudinal grooves and longitudinal ribs disposed on an inner surface of said first rotary part adjacent said inner centering surface; and
    second coupling means comprising
    at least two longitudinal slots provided in an outer surface of said second rotary part, said longitudinal slots being disposed symmetrically about an axis of rotation of said second rotary part, each of said longitudinal slots facing one of said longitudinal grooves of said first rotary part when said first and second rotary parts are interconnected,
    at least two keys carried in said longitudinal slots of said second rotary part and having widths substantially equal to widths of said longitudinal grooves, said keys being disposed symmetrically about the axis of rotation of said second rotary part and being radially movable relative to said axis of rotation, and
    a plurality of spring means acting radially upon said keys such that said keys are urged into said longitudinal grooves when said second rotary part is axially inserted in said first rotary part.

2. The device of claim 1, wherein the number of said longitudinal grooves of said first rotary part is greater than the number of said keys of said second rotary part.

3. The device of claim 2, wherein said second rotary part includes a plurality of circular grooves, said spring means taking the form of split rings fitted with play into said circular grooves, and each of said keys being supported by at least one of said split rings.

4. The device of claim 1, wherein said spring means take the form of split rings, said second rotary part bearing two keys positioned diametrically opposite one another and supported by two split rings, one end of each of said keys being rigidly connected to one of said two split rings and the other end of each of said keys guiding the other of said two split rings with play.

5. The device of claim 4, wherein said keys include at the ends thereof openings having a cross-section matching that of said rings, said rings being fitted in respective said openings.

6. The device of claim 5, wherein said rings are of rectangular cross-section, said openings taking the form of slits each opening out in an end of one of said keys.

7. The device of claim 6, wherein each of said rings is soldered in one of said slits of one of said keys and guided with play in the other of said slits of another of said keys.

8. The device of claim 1, wherein said first rotary part is a spindle and said second rotary part is a tool-holder.

9. The device of claim 8, wherein said inner and outer centering surfaces are respectively adjacent to said first and second coupling means.

10. The device of claim 1, wherein said inner centering surface and said outer centering surface are corresponding frusto-conical surfaces.

* * * * *